(12) United States Patent
Seibert et al.

(10) Patent No.: US 11,385,728 B2
(45) Date of Patent: Jul. 12, 2022

(54) SYSTEM AND METHOD OF ADJUSTING MOUSE SENSITIVITY

(71) Applicant: Dell Products L.P., Round Rock, TX (US)

(72) Inventors: Philip M. Seibert, Austin, TX (US); Marc Randall Hammons, Round Rock, TX (US); Erik Summa, Austin, TX (US); David Joseph Zavelson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/816,332

(22) Filed: Mar. 12, 2020

(65) Prior Publication Data

US 2021/0286445 A1 Sep. 16, 2021

(51) Int. Cl.
*G06F 3/038* (2013.01)
*G06F 3/04812* (2022.01)
*G06F 3/0354* (2013.01)

(52) U.S. Cl.
CPC .......... *G06F 3/038* (2013.01); *G06F 3/03543* (2013.01); *G06F 3/04812* (2013.01)

(58) Field of Classification Search
CPC .............................. G06F 3/038; G06F 3/03543
See application file for complete search history.

(56) References Cited

U.S. PATENT DOCUMENTS

| | | | |
|---|---|---|---|
| 2004/0066371 A1* | 4/2004 | Huang | G06F 3/03543 345/163 |
| 2006/0103733 A1* | 5/2006 | Grady | G06F 1/3203 348/208.3 |
| 2010/0090955 A1* | 4/2010 | Chen | G06F 3/0317 345/166 |
| 2015/0302966 A1* | 10/2015 | Soelberg | G06F 3/03543 463/37 |
| 2016/0109964 A1* | 4/2016 | Wang | G06F 3/03543 345/166 |
| 2016/0313805 A1* | 10/2016 | Vroom | G06F 3/013 |
| 2018/0292912 A1* | 10/2018 | Malisoff | G06F 3/03543 |
| 2019/0220107 A1* | 7/2019 | Odgers | G06F 3/03543 |
| 2019/0354259 A1* | 11/2019 | Park | G06F 3/017 |

* cited by examiner

*Primary Examiner* — Chun-Nan Lin
(74) *Attorney, Agent, or Firm* — Baker Botts L.L.P.

(57) ABSTRACT

In one or more embodiments, a mouse for an information handling system has a plurality of force or tilt sensors. When a sensor detects a force or tilt value above a threshold value, a microcontroller unit (MCU) determines how fast the mouse is moving. If the mouse is moving above a threshold rate, the MCU determines the user is making a coarse movement and the MCU sends the mouse output to a processor for normal cursor adjustment. If the mouse is moving slower than a mouse speed threshold value, the MCU determines the user is trying to make a fine adjustment and the MCU adjusts the mouse sensitivity and sends the mouse output to the processor for fine cursor adjustment. The sensors may be in the bottom, sides or skirt of the mouse or a mousepad associated with the mouse.

20 Claims, 3 Drawing Sheets

SYSTEM AND METHOD OF ADJUSTING MOUSE SENSITIVITY

BACKGROUND

Field of the Disclosure

This disclosure relates generally to information handling systems and more particularly to systems and methods of adjusting mouse sensitivity.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Users such as PC gamers are looking for any competitive advantage they can get. For example, a gamer may want faster cursor movement to quickly engage multiple targets in a short time but may want more accurate cursor movement for aiming at a specific target. Other users such as graphic artists may also want the benefits of a mouse that has adjustable sensitivity. In one or more embodiments, one or more systems, methods, and/or processes respond to actions of a user and dynamically adjust the sensitivity of a mouse.

Embodiments may eliminate the need for a manual sensitivity toggling with a mouse sensitivity adjustment system and method based on force or tilt values. Force or tilt sensors associated with the mouse may be communicatively coupled to a microcontroller unit (MCU). One or more sensors may be located on the bottom, a side or a skirt of the mouse or in a mousepad associated with the mouse. If these sensors send force or tilt values above a sensor threshold value, the MCU communicates with the mouse position sensor to determine if the mouse is moving. If the mouse is moving above a mouse speed threshold value, the MCU may determine the user is making a coarse adjustment to the mouse position and not make any adjustments to the sensitivity such that the MCU outputs a corresponding change in the mouse position to a processor associated with a display. If the mouse is moving below the mouse speed threshold value (including not moving), the MCU may determine the user is trying to make a fine movement of the cursor (such as aligning crosshairs on a target in a game or making precise adjustments to a detailed project). The MCU may increase the mouse sensitivity and output the mouse position information to the processor such that a movement of the mouse makes a fine adjustment to the cursor position on the display.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
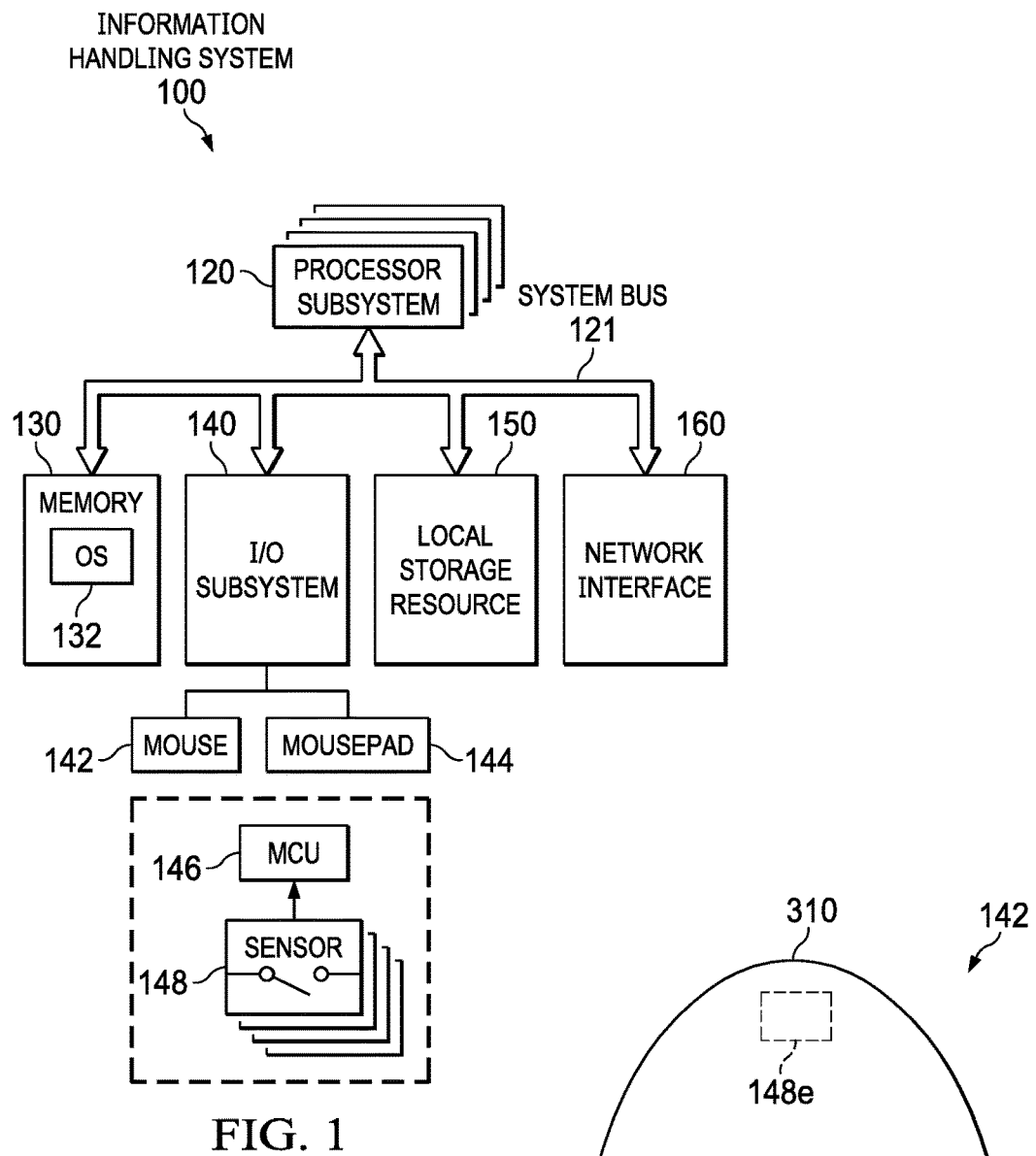
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

The sensitivity of a computer mouse is typically expressed in dots per inch (DPI), wherein the higher the DPI, the farther a cursor moves on a display when a mouse is moved. In other words, a mouse with a higher DPI setting detects and reacts to smaller mouse movements.

In one or more embodiments, a mouse for an information handling system may have a set of sensors adapted for sensing force or tilt applied to the mouse and be controllable based on a first sensitivity for coarse adjustments of a cursor in response to movements of the mouse or a second sensitivity for fine adjustments of the cursor in response to movements of the mouse. These sensors may provide values associated with a force or tilt and communicate these values to a microcontroller unit (MCU). If the MCU detects an increase in force on the mouse or a tilt of the mouse and determines that the mouse is not moving, the MCU may use the force and/or tilt values as a basis to adjust the sensitivity of the mouse.

Turning to the drawings, FIG. 1 illustrates a block diagram depicting selected elements of an embodiment of information handling system 100. It is noted that FIG. 1 is not drawn to scale but is a schematic illustration. In various embodiments, information handling system 100 may represent different types of devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory subsystem 130, an I/O subsystem 140, local storage resource 150, and a network interface 160. Also shown within information handling system 100 are mouse 142, mousepad 144, microcontroller unit (MCU) 146 and a plurality of sensors 148, as discussed below in greater detail.

Processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory subsystem 130 is shown including an operating system (OS) 132, which may represent an execution environment for information handling system 100. Operating system 132 may be UNIX or be based on UNIX (e.g., a LINUX variant), one of several variants of Microsoft Windows® operating systems, an Apple® MacOS operating system, an embedded operating system, a gaming operating system, or another suitable operating system.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a display adapter, a keyboard, mouse 142 and/or mousepad 144, among other examples. In some implementations, I/O subsystem 140 may support so-called 'plug and play' connectivity to external devices, in which the external devices may be added or removed while information handling system 100 is operating. Mouse 142 and/or mousepad 144 may include microcontroller (also referred to as a microcontroller unit or MCU) 146 and a set of sensors 148. Mouse 142 may be communicatively coupled to a display adapter such that a user moving mouse 142 will cause a cursor to move on a display coupled to the display adapter. MCU 146 may contain or be communicatively coupled to a memory medium (not shown) storing a set of instructions for dynamically adjusting a sensitivity of mouse 142.

Local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

Network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

Referring still to FIG. 1, I/O subsystem 140 may include a display (not shown) for displaying information such as a cursor. Mouse 142 and/or mousepad 144 may be communicatively coupled to a processor subsystem 120, wherein a user moving mouse 142 is able to change the position of the cursor on the display. Generally, the position of a cursor is based on a position of mouse 142 and a movement of the cursor is based on motion of mouse 142 such that moving mouse 142 a distance will cause the cursor to move a corresponding distance on the display and the rate at which the cursor moves is based on the rate at which mouse 142 is moved. In some embodiments, movement of mouse 142 is determined by a mouse position sensor (not shown) in mouse 142. In other embodiments, movement of mouse 142 is determined by a mouse position sensor (not shown) in mousepad 144.

Figure 2:
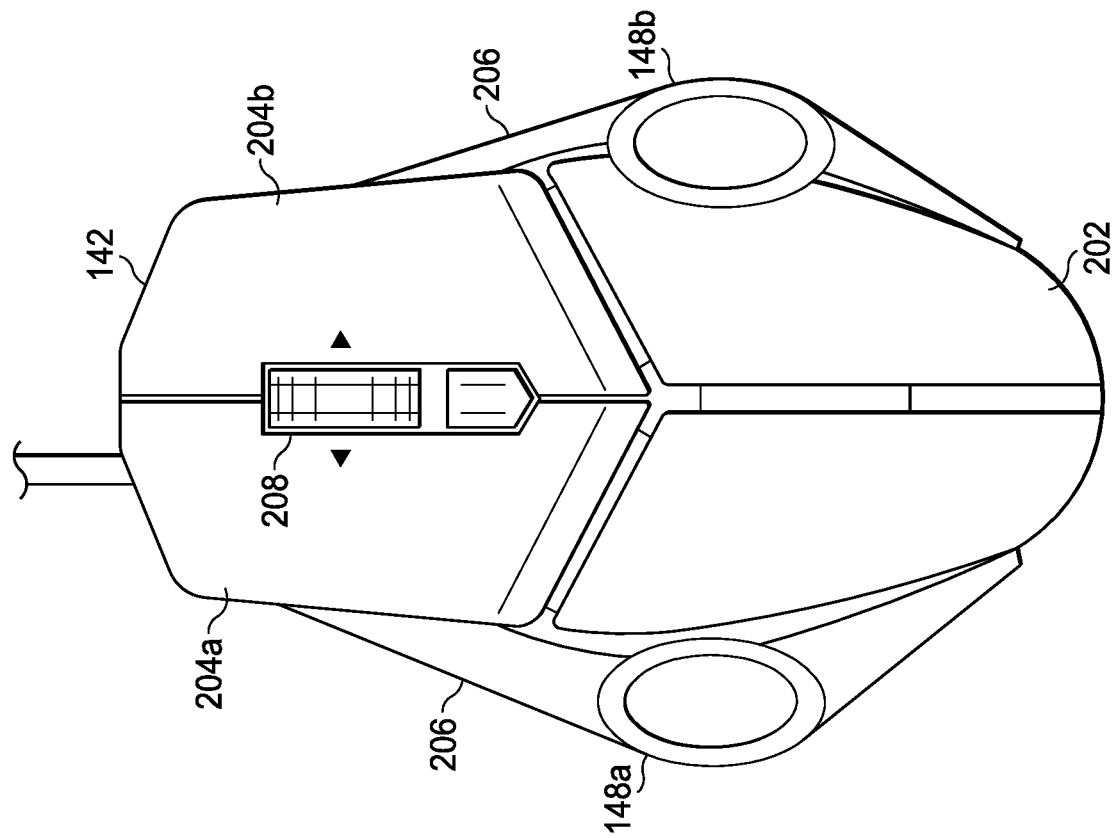

Turning now to FIG. 2, a top view of mouse 142 is illustrated having palm rest area 202, left-click button 204*a*, right click button 204*b*, skirt 206 having sensors 148*a* and 148*b* and wheel 208.

In some embodiments, sensors 148*a*, 148*b* positioned on the sides of mouse 142 may be force sensors configured to detect forces from a user and communicate the force values to MCU 146. For example, sensor 148*a* may be a force sensor positioned for detecting forces applied by a user on skirt 206 on the left side of mouse 142 and sensor 148*b* may be a force sensor positioned for detecting forces applied by the user on skirt 206 on the right side of mouse 142. MCU 146 may receive a small force value from only one of sensors 148*a* and 148*b* and receive mouse position values from a mouse position sensor. If MCU 146 receives a small non-zero force value and the mouse position values indicate mouse 142 is not moving (or moving below a mouse speed threshold value), MCU 146 may determine the user is trying to make a fine adjustment to a cursor position on a display by applying a small force to only one side of mouse 142. If so, MCU 146 may increase the sensitivity of mouse 142 such that movements of mouse 142 result in fine adjustments to the position of a cursor.

In some embodiments, MCU 146 may receive force values from sensors 148a and 148b and compare the force values with a force threshold value stored in memory. If a force value is greater than the stored force threshold value and the mouse position values indicate mouse 142 is not moving (or moving slower than a mouse speed threshold value), MCU 146 may determine the user is trying to make a fine adjustment of mouse 142, increase the sensitivity of mouse 142, and send instructions to processor 120 such that movements of mouse 142 result in fine adjustments to the position of a cursor. Otherwise, if the force value is less than the stored force threshold value or the mouse position values indicate mouse 142 is moving or moving faster than a mouse speed threshold value, MCU 146 may send instructions to processor 120 such that movements of mouse 142 result in coarse adjustments to the position of a cursor.

Users in intense gaming situations or otherwise trying to make fine adjustments to the position of a cursor on a display may tend to grip the mouse tighter. In some embodiments, if MCU 146 determines mouse 142 is not moving but force is applied to both sensors 148a and 148b, MCU 146 may determine the user is gripping mouse 142 and calculate a force differential to determine the user is trying to make a fine adjustment. MCU 146 may determine the user is trying to move a cursor to the left or the right based on the force differential and output instructions to processor 120 coupled to the display to make a fine adjustments to the position of a cursor. In some embodiments, if MCU 146 determines mouse 142 is not moving but force is applied to both sensors 148a and 148b, MCU 146 may adjust the sensitivity of mouse 142 and instructions sent to processor 120 will cause the cursor to move a distance corresponding to the force differential. In some embodiments, MCU 146 may adjust the DPI (dots per inch) of mouse 142 or mousepad 144 based on a force value or a force differential. If the user relaxes or otherwise reduces pressure on sensors 148a and 148b, MCU 146 may decrease the sensitivity of mouse 142 and send instructions to processor 120 such that movements of mouse 142 result in coarse adjustments to the position of a cursor.

Figure 3:
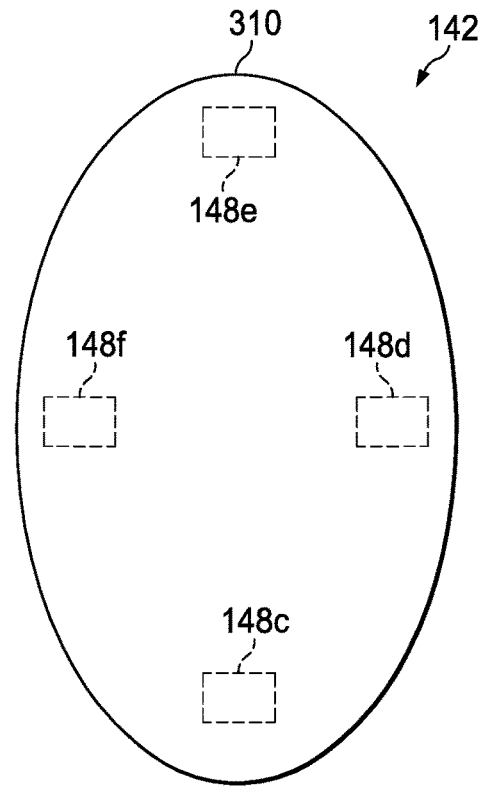
FIGS. 2-4 illustrate top and bottom views of examples of a mouse according to one or more embodiments.

Not all users will grip mouse 142 when trying to make fine adjustments to a cursor. For example, a user might not grip mouse 142 such that sensors 148a-b detect zero forces, but the user may apply a downward force on mouse 142. FIG. 3 depicts a bottom view of mouse 142 having four sensors 148c-f positioned on bottom panel 310 of mouse 142 to detect downward forces on mouse 142. Referring to FIGS. 2 and 3, in some embodiments, sensors 148a-b on sides of mouse 142 may detect zero forces but sensors 148c-f positioned on bottom panel 310 of mouse 142 may detect non-zero downward forces on mouse 142 due to a user trying to make a fine adjustment to a cursor on a display. Referring to FIGS. 1 and 3, one or more sensors 148c-f may send a force value to MCU 146 indicating a downward force on mouse 142. If MCU 146 receives a non-zero force value from any of sensors 148c-f, MCU 146 may communicate with a mouse position sensor to determine if the mouse position is changing above a mouse speed threshold value. If the mouse position is not changing (or changing below a mouse speed threshold value), MCU 146 may determine the user is trying to make a fine adjustment of a cursor on a display and use one or more force values from sensors 148c-f as a basis for adjusting a sensitivity of mouse 142.

Still referring to FIG. 3, although mouse 142 may be configured for continuous contact with a surface, a gamer in an intense scenario might try to tilt mouse 142. In some embodiments, if two or more force values communicated by sensors 148c-f indicate an uneven distribution of forces, MCU 146 may determine the user is trying to tilt mouse 142 to make a fine adjustment of a cursor on a display and may increase the sensitivity of mouse 142.

In some embodiments, MCU 146 may adjust the sensitivity of mouse 142 proportional to a force value or may adjust the sensitivity of mouse 142 from a first sensitivity to a second sensitivity associated with any force value greater than a force threshold value.

In some embodiments, sensors 148c-f may be in mousepad 144. A user may use a basic mouse (not shown) and still have at least some of the functionality of mouse 142. For example, mousepad 144 may detect forces applied by a user pressing down on mouse 142. In some embodiments, mousepad 144 may sense the location of mouse 142 and respond to sensors surrounding mouse 142. In some embodiments, a user may contact mousepad 144 to increase the sensitivity of mousepad 144.

If the user relaxes or otherwise reduces the downward force on mouse 142 such that the force values detected by sensors 148c-f decrease, MCU 146 may decrease the sensitivity of mouse 142 such that movements of mouse 142 result in coarse adjustments to the position of a cursor.

Some users may tilt mouse 142 when trying to make a fine adjustment to a cursor. For example, in some gaming scenarios, instead of gripping mouse 142 or applying a downward force on mouse 142, a user might stiffen their arm and tilt mouse 142 when trying to make a fine adjustment to the cursor, wherein sensors 148a, 148b might detect low or zero forces exerted by the user and sensors 148c-f might indicate no downward force is exerted on mouse 142. In some embodiments, a tilt sensor may sense tilt and communicate tilt information to MCU 146.

Figure 4:
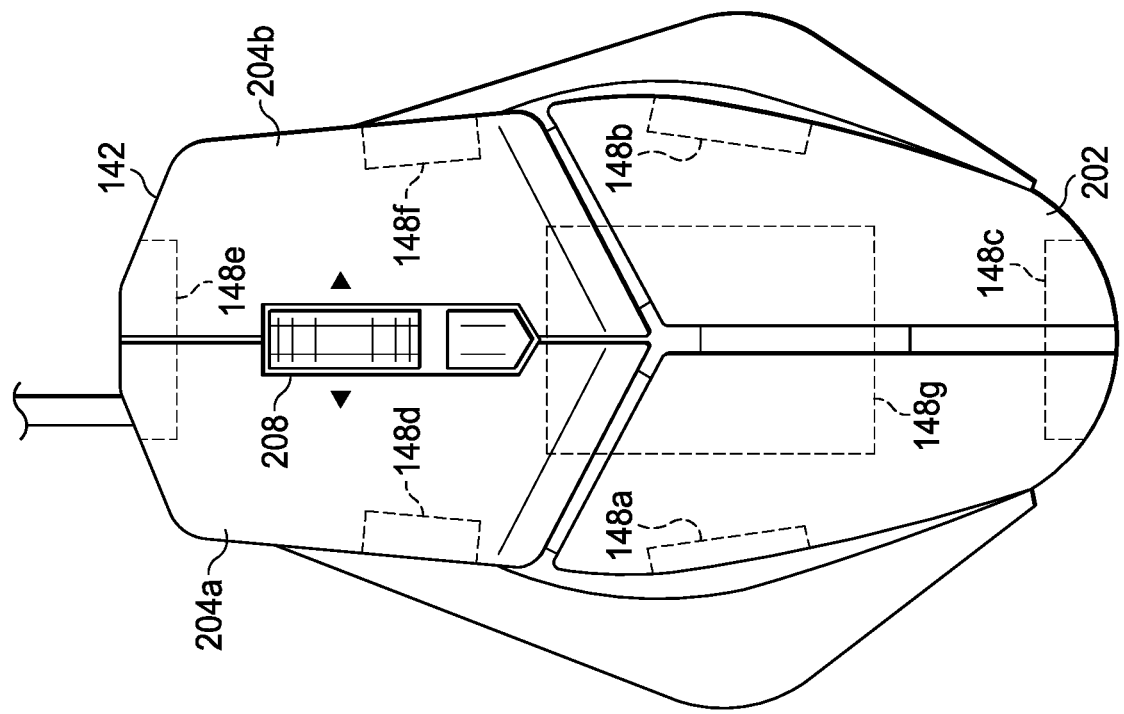

FIG. 4 depicts a top view of mouse 142 having palm rest area 202, left-click button 204a, right click button 204b, skirt 206, wheel 208, and sensors 148a-g, wherein sensor 148g is a tilt sensor. Referring to FIGS. 1-4, mouse 142 may include multiple sensors 148 located in various areas of mouse 142. For example, mouse 142 may include sensors 148a,148b on skirt 206, sensors 148c-f on a bottom panel 310 of mouse 142 or mousepad 144 as described above with respect to FIGS. 2 and 3 and may also include tilt sensor 148g located inside mouse 142.

If MCU 146 receives tilt sensor values from tilt sensor 148g indicating a user is tilting mouse 142, MCU 146 may increase the sensitivity of mouse 142 based on a tilt sensor value. In some embodiments, tilt sensor 148g may be an accelerometer capable of determining a tilt value and detecting movement of mouse 142, and MCU 146 may be configured to adjust the sensitivity of mouse 142 based on the tilt values and movement values provided by tilt sensor 148g. In some embodiments, if MCU 146 receives a tilt value of mouse 142 but receives no mouse position values indicating a movement of mouse 142, MCU 146 may determine a user is trying to make a fine adjustment to the position of a cursor and communicate with processor subsystem 120 to move the cursor at a low DPI based on the degree of tilt. In some embodiments, if MCU 146 receives a tilt value of mouse 142 and receives mouse position values indicating a movement of mouse 142 below a mouse speed threshold value, MCU 146 may determine a user is trying to make a fine adjustment to the position of a cursor and communicate with processor subsystem 120 to move the cursor at a low DPI based on the degree of tilt.

Figure 5:
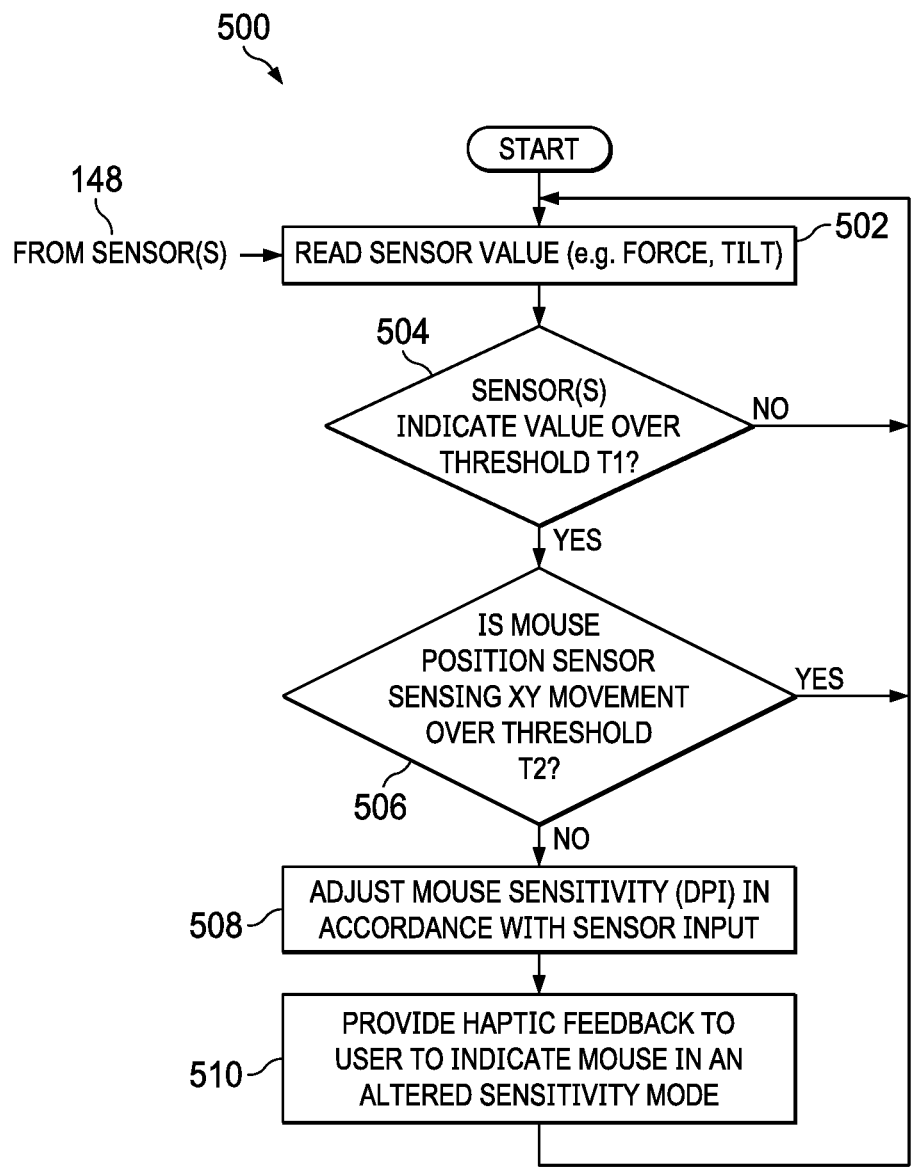
FIG. 5 illustrates an example of a method of adjusting mouse sensitivity, according to one or more embodiments.

Turning now to FIG. 5, an example of a method of adjusting a mouse sensitivity is illustrated, according to one or more embodiments.

Method 500 begins at step 502, when sensor values are received from a set of sensors, which may include one or more sensors 148, which may include force sensors and tilt sensors.

At step 504, MCU 146 may determine if one or more sensor values are over a sensor threshold value (T1). A sensor threshold value may be, for example, a force value or force differential, or tilt or a degree of tilt.

At step 506, MCU 146 may determine if a mouse position sensor is sensing any change in mouse position faster than a mouse speed threshold value (T2). The mouse position sensor may be in mouse 142 or in mousepad 144 associated with mouse 142. The mouse position sensor may be configured to sense lateral movement (e.g., X movement) and transverse movement (e.g., Y movement). In some embodiments, the mouse speed threshold value may be zero such that any non-zero change in mouse position is greater than the mouse speed threshold value.

If the mouse position value is changing at a rate faster than the mouse speed threshold value, MCU 146 may determine the user is trying to make coarse movements to the cursor position and MCU 146 may output mouse position values to a processor based on a first sensitivity associated with coarse movement of the cursor. If the sensitivity of mouse 142 is at a higher DPI, MCU 146 may decrease the sensitivity of mouse 142. The first sensitivity may be a default value stored in a memory medium associated with mouse 142.

If the mouse position value is changing at a rate slower than the mouse speed threshold value, MCU 146 may determine the user is trying to make a fine movement of the cursor. At step 508, MCU 146 may increase the mouse sensitivity (e.g., DPI) and output mouse position values to a processor based on a second sensitivity associated with fine movement of the cursor. The second sensitivity may be a set value stored in a memory medium associated with mouse 142 or may be proportional to sensor values.

In some embodiments, at 510, MCU 146 may provide haptic feedback to a user to indicate an adjustment has been made to the sensitivity of mouse 142.

One or more of threshold values described above may be based on the sensor or may be set by a user. For example, sensors 148 made by various vendors may vary in accuracy and response, and users may prefer higher/lower thresholds based on the use of mouse 142.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A mouse for sending instructions to a processor for displaying a position of a cursor on a display of an information handling system, the mouse comprising:
   a mouse position sensor;
   a plurality of force sensors, a microcontroller unit (MCU) coupled to the plurality of force sensors; and
   a memory medium coupled to the MCU, wherein the memory medium includes MCU instructions, which when executed by the MCU, cause the MCU to:
      receive a first set of mouse position values from the mouse position sensor;
      receive a second set of mouse position values from the mouse position sensor;
      determine a distance moved by the mouse and a mouse position value rate of change between the first set of mouse position values and the second set of mouse position values;
      receive a set of force sensor values from the plurality of force sensors;
      compare the set of force sensor values with a force sensor threshold value stored in the MCU to determine an increase or a decrease in a sensitivity of the mouse; wherein:
      if the set of force sensor values are less than the force sensor threshold value, the MCU instructions cause the MCU to:
         determine a user is trying to make a coarse adjustment of the cursor on the display; and
         send a first set of processor instructions to the processor such that movement of the mouse over the distance will cause the cursor to move a first corresponding distance on the display based on the decrease in the sensitivity of the mouse;
      if the first set of force sensor values are greater than the force sensor threshold value and the mouse position value rate of change is less than a mouse speed threshold, the MCU instructions cause the MCU to:
         determine the user is trying to make a fine adjustment of the cursor on the display; and
         send a second set of processor instructions to the processor such that movement of the mouse over the distance will cause the cursor to move over a second corresponding distance on the display less than the first corresponding distance based on the increase in the sensitivity of the mouse.

2. The mouse of claim 1, wherein:
   if the mouse position value rate of change is less than the mouse speed threshold value, the MCU instructions, when executed by the MCU, cause the MCU to increase the dots per inch (DPI) of the mouse to increase the sensitivity of the mouse; and
   if the mouse position value rate of change is greater than the mouse speed threshold, the MCU instructions, when executed by the MCU, cause the MCU to decrease the dots per inch (DPI) of the mouse to decrease the sensitivity of the mouse.

3. The mouse of claim 2, wherein:
   the plurality of force sensors are positioned on at least two sides of the mouse; and
   the MCU instructions, when executed by the MCU, cause the MCU to:
      determine the set of force sensor values comprise a force sensor value received from one force sensor;

determine the force sensor value received from the one force sensor is greater than the force sensor threshold value;
increase the sensitivity of the mouse based on the force sensor value received from the one force sensor; and
send the second set of processor instructions to the processor such that movement of the mouse over the distance will cause movement of the cursor over the second corresponding distance on the display.

4. The mouse of claim 2, wherein:
the plurality of force sensors are positioned on at least two sides of the mouse; and
the MCU instructions, when executed by the MCU, cause the MCU to:
determine the set of force sensor values comprise force sensor values received from two force sensors of the plurality of force sensors;
determine the force sensor values received from the two force sensors are greater than the force sensor threshold value;
determine a force differential between the two force sensor values received from the two force sensors;
increase the sensitivity of the mouse based on the force differential; and
send the second set of processor instructions to the processor such that movement of the mouse over the distance will cause movement of the cursor over the second corresponding distance on the display.

5. The mouse of claim 1, wherein:
the plurality of force sensors are positioned and configured for detecting a downward force on the mouse; and
the MCU instructions, when executed by the MCU, cause the MCU to:
determine the set of force sensor values comprises a force sensor value associated with the downward force;
determine the force sensor value is greater than the force sensor threshold value;
increase the sensitivity of the mouse based on the force sensor value associated with the downward force; and
send the second set of processor instructions to the processor such that movement of the mouse over the distance will cause movement of the cursor over the second corresponding distance on the display.

6. The mouse of claim 1, wherein:
the plurality of force sensors are positioned on a bottom surface of the mouse; and
the MCU instructions, when executed by the MCU, cause the MCU to:
determine the set of force sensor values comprises a first force sensor value is received from a first force sensor;
determine the set of force sensor values comprises a second force sensor value is received from a second force sensor;
determine a force differential between the first force sensor value and the second force sensor value;
increase the sensitivity of the mouse based on the force differential between the first force sensor value and the second force sensor value; and
send the second set of processor instructions to the processor such that movement of the mouse over the distance will cause movement of the cursor over the second corresponding distance on the display.

7. An information handling system comprising:
a processor;
a display communicatively coupled to the processor and configured to display a cursor;
a mouse communicatively coupled to the processor, the mouse comprising:
a mouse position sensor;
a plurality of force sensors associated with the mouse, wherein each force sensor is configured for detecting a force value associated with the mouse; and
a microcontroller unit (MCU) communicatively coupled to the mouse position sensor, the plurality of force sensors and the processor; and
a memory medium coupled to the MCU, wherein the memory medium includes MCU instructions, which when executed by the MCU, cause the MCU to:
receive a first set of mouse position values from the mouse position sensor;
receive a second set of mouse position values from the mouse position sensor;
determine a distance moved by the mouse and a mouse position value rate of change based on the first set of mouse position values and the second set of mouse position values;
receive a set of force sensor values from the plurality of force sensors;
compare the set of force sensor values with a force sensor threshold value stored in the MCU to determine an increase or a decrease in a sensitivity of the mouse
wherein:
if the set of force sensor values are less than the force sensor threshold value, the MCU instructions cause the MCU to:
determine a user is trying to make a coarse adjustment of the cursor on the display; and
send a first set of processor instructions to the processor such that movement of the mouse over the distance will cause the cursor to move over a first corresponding distance on the display based on the decrease in the sensitivity of the mouse;
if the set of force sensor values are greater than the force sensor threshold value and the mouse position value rate of change is less than a mouse speed threshold, the MCU instructions cause the MCU to:
determine the user is trying to make a fine adjustment of the cursor on the display; and
send a second set of processor instructions to the processor such that movement of the mouse the distance will cause the cursor to move over a second corresponding distance on the display less than the first corresponding distance based on the increase in the sensitivity of the mouse.

8. The information handling system of claim 7, wherein the MCU is configured to increase the dots per inch (DPI) of the mouse to increase the sensitivity of the mouse when the mouse position value rate of change is less than the mouse speed threshold and decrease the dots per inch (DPI) to decrease the sensitivity of the mouse of the mouse when the mouse position value rate of change is greater than the mouse speed threshold.

9. The information handling system of claim 8, wherein:
the plurality of force sensors are positioned on at least two sides of the mouse; and
the MCU instructions, when executed by the MCU, cause the MCU to:
determine the set of force sensor values comprises a force sensor value received from one force sensor;

determine the force sensor value received from the one force sensor is greater than the force sensor threshold value;

increase the sensitivity of the mouse based on the force sensor value received from the one force sensor; and send the second set of processor instructions to the processor such that movement of the mouse over the distance will cause movement of the cursor over the second corresponding distance on the display.

10. The information handling system of claim 7, wherein:
the plurality of force sensors are positioned on at least two sides of the mouse and; and
the MCU instructions, when executed by the MCU, cause the MCU to:
determine the set of force sensor values comprises two force sensor values received from two force sensors of the plurality of force sensors;
determine the force sensor values received from the two force sensors are greater than the force sensor threshold value;
determine a force differential between the two force sensor values;
increase the dots per inch of the mouse based on the force differential; and
send the second set of instructions to the processor such that movement of the mouse over the distance will cause movement of the cursor over the second corresponding distance.

11. A method for adjusting mouse sensitivity for a mouse communicatively coupled to a processor coupled to a display, the method comprising:
receiving a first set of mouse position values from a mouse position sensor;
receiving a second set of mouse position values from the mouse position sensor;
determining a distance moved by the mouse and a mouse position rate of change based on the first set of mouse position values and the second set of mouse position values;
receiving, by a microcontroller unit (MCU) associated with the mouse, a set of force sensor values from the plurality of force sensors associated with the mouse;
comparing the set of force sensor values with a force sensor threshold value stored in the MCU to determine whether to increase or decrease a sensitivity of the mouse and;
communicating with the mouse position sensor to determine if the mouse position is changing;
if the mouse position value rate of change is greater than a mouse speed threshold, decreasing the sensitivity of the mouse and sending a first set of instructions to the processor such that movement of the mouse the distance results in the cursor moving a first corresponding distance on the display based on the decrease in the sensitivity of the mouse; and
if the mouse position rate of change is less than the mouse speed threshold and a force sensor value of the set of force sensor values exceeds the force sensor threshold value, increasing the sensitivity of the mouse and sending a second set of instructions to the processor such that movement of the mouse the distance results in the cursor moving a second corresponding distance on the display based on the increase in the sensitivity of the mouse.

12. The method of claim 11, wherein the mouse speed threshold rate is zero.

13. The method of claim 11, further comprising communicating haptic feedback to a user when the sensitivity of the mouse is increased or decreased.

14. The method of claim 11, wherein the plurality of force sensors are in at least one of a side surface, a skirt, a bottom surface and a palm rest area of the mouse.

15. The method of claim 11, wherein the plurality of force sensors are in a mousepad associated with the mouse.

16. The method of claim 11, wherein:
if the mouse position value rate of change is less than the mouse speed threshold value, the method comprises increasing the dots per inch (DPI) of the mouse; and
if the mouse position value rate of change is greater than the mouse speed threshold value, the method comprises decreasing the dots per inch (DPI) of the mouse.

17. The method of claim 11, wherein:
the plurality of force sensors are positioned on at least two sides of the mouse; and
the method comprises:
determining the set of force sensor values comprises a force sensor value received from one force sensor;
determining the force sensor value received from the one force sensor is greater than the force sensor threshold value;
increasing the sensitivity of the mouse based on the force sensor value received from the one force sensor; and
sending the set of instructions to the processor such that movement of the mouse over the distance will cause movement of the cursor over the second corresponding distance.

18. The method of claim 11, wherein:
the set of force sensors are positioned on at least two sides of the mouse; and
the method comprises:
determining the set of force sensor values comprises two force sensor values received from two force sensors;
determining the force sensor values received from the two force sensors are greater than the force sensor threshold value;
determining a force differential between the two force sensor values received from the two force sensors;
increasing the sensitivity of the mouse based on the force differential; and
sending the second set of processor instructions to the processor such that movement of the mouse over the distance will cause movement of the cursor over the second corresponding distance.

19. The method of claim 11, wherein:
the plurality of force sensors are positioned in a bottom surface of the mouse and configured for detecting a downward force on the mouse; and
the method comprises:
determining the set of force sensor values comprises a force sensor value associated with the downward force;
determining the force sensor value associated with the downward force is greater than the force sensor threshold value;
increasing the sensitivity of the mouse based on the force sensor value associated with the downward force; and
sending the second set of processor instructions to the processor such that movement of the mouse over the distance will cause movement of the cursor over the second corresponding distance.

20. The method of claim 11, wherein:
the set of force sensors are positioned on a bottom surface of the mouse; and
the method comprises:
- determining the set of force sensor values comprises a first force sensor value received from a first force sensor;
- determining the set of force sensor values comprises a second force sensor value received from a second force sensor;
- determining a force differential between the first force sensor value and the second force sensor value;
- increasing the sensitivity of the mouse based on the force differential; and
- sending the set of instructions to the processor such that movement of the mouse over the distance will cause movement of the cursor over the second corresponding distance.

* * * * *